H. N. RAYMOND.
SOLAR TRANSIT.
APPLICATION FILED JULY 13, 1918.
1,309,486.
Patented July 8, 1919.
3 SHEETS—SHEET 1.
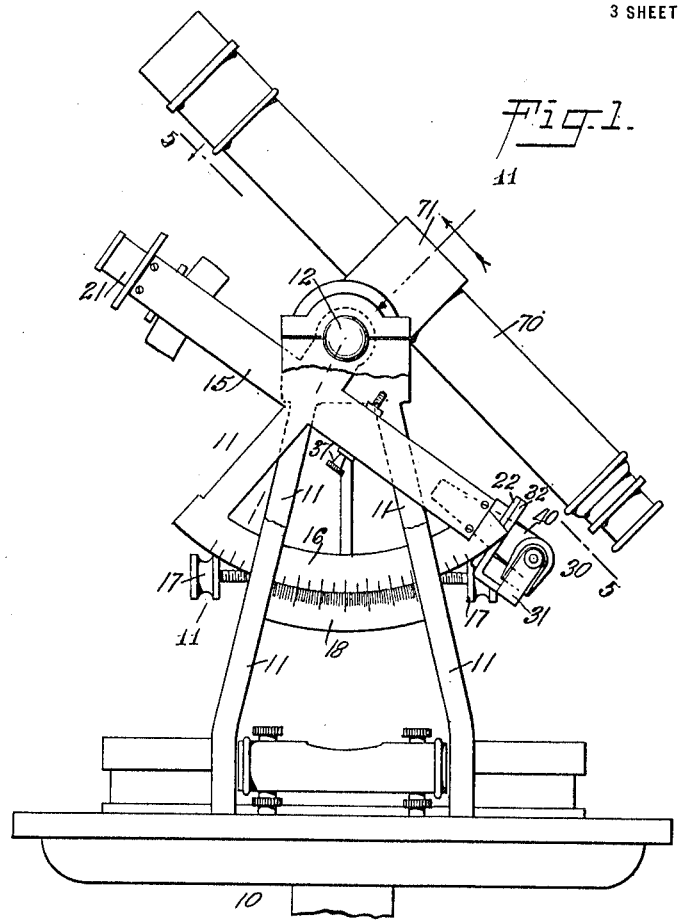
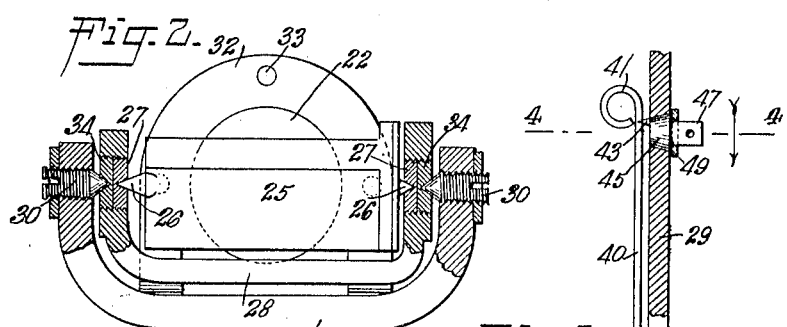
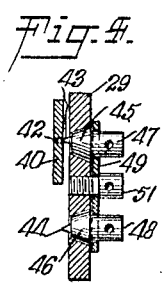
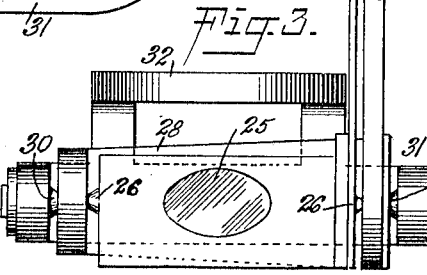
WITNESSES
INVENTOR
Herbert N. Raymond
BY
ATTORNEYS H. N. RAYMOND.
SOLAR TRANSIT.
APPLICATION FILED JULY 13, 1918.
1,309,486.
Patented July 8, 1919.
3 SHEETS—SHEET 2.
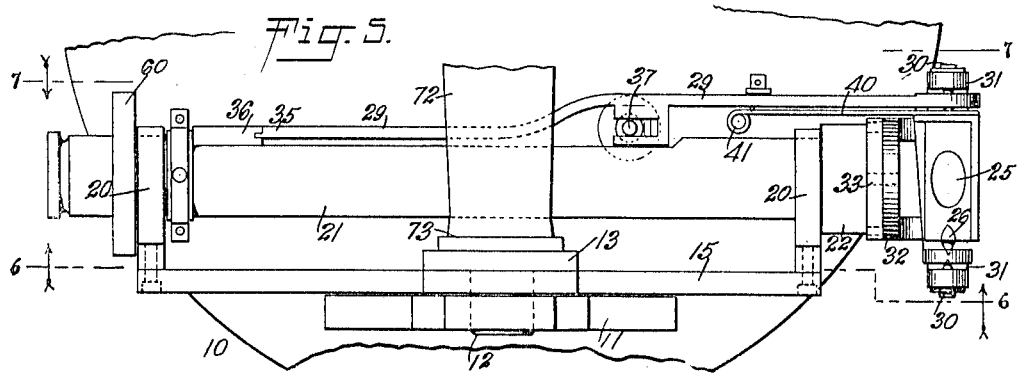
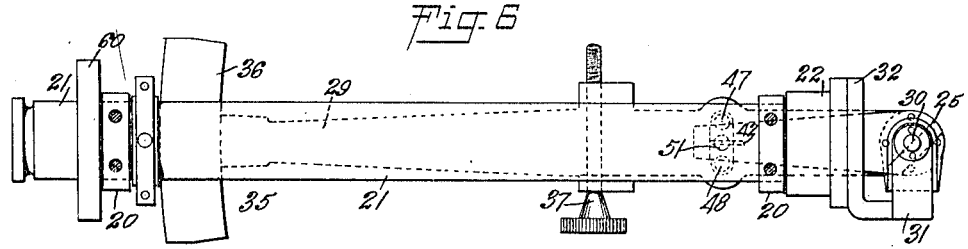
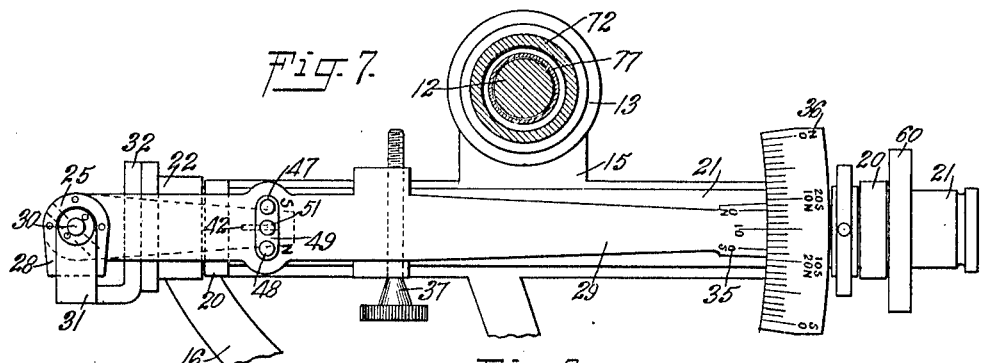
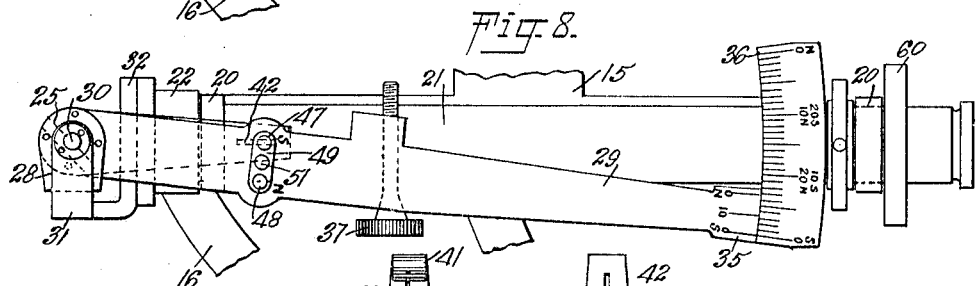
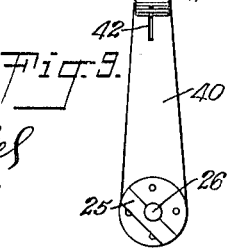
WITNESSES
INVENTOR
Herbert N. Raymond
BY
ATTORNEYS

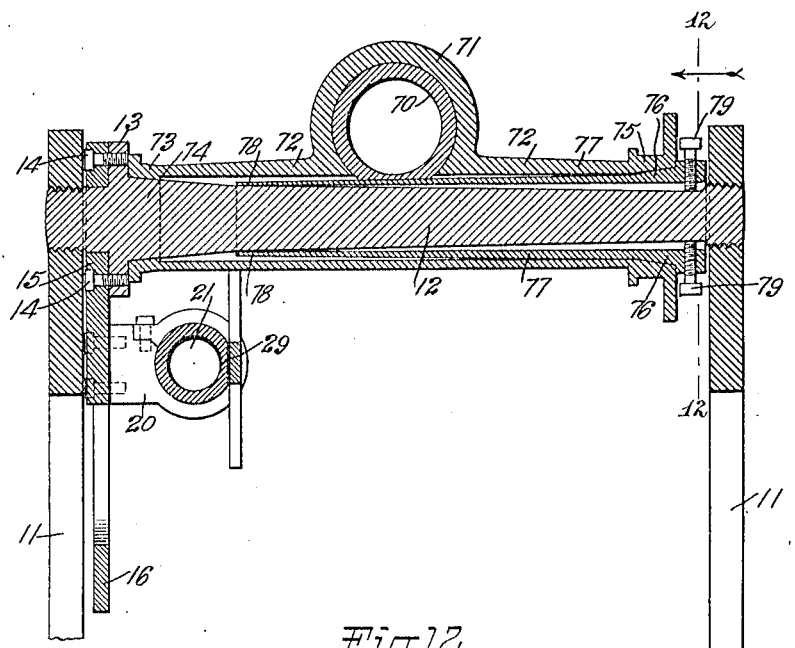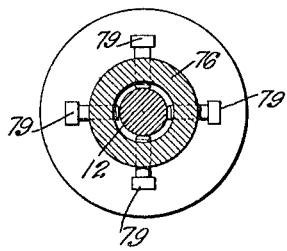

UNITED STATES PATENT OFFICE.

HERBERT NEWTON RAYMOND, OF OLYMPIA, WASHINGTON.

SOLAR TRANSIT.

1,309,486.

Specification of Letters Patent.

Patented July 8, 1919.

Original application filed November 6, 1917, Serial No. 200,565. Divided and this application filed July 13, 1918. Serial No. 244,800.

*To all whom it may concern:*

Be it known that I, HERBERT N. RAYMOND, a citizen of the United States, and a resident of Olympia, in the county of Thurston and State of Washington, have invented a new and Improved Solar Transit, of which the following is a full, clear, and exact description, this being a division of the Letters Patent for a solar transit, No. 1,274,935, granted to me on August 6, 1918.

The object of the invention is to provide a solar transit of the solar telescope and reflector type and provided with an adjustable reflector which in one position indicates north declinations and in another position indicates south declinations. Another object is to provide an adjusting means for the reflector readily controlled by the user for eliminating what is known as "index error" of the declination arc. Another object is to permit the use of the declination arc sufficiently long to indicate the declinations one way, that is, north or south. Another object is to mount the solar telescope between the standards of the transit without interfering with the transit telescope in any one of its positions, at the same time not requiring a loose, heavy counterpoise and allowing increase in the length of the declination arm to insure setting off of the declinations with great accuracy.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the solar transit with part of one of the standards broken out;

Fig. 2 is an enlarged cross section of the mounting of the reflector for the solar telescope;

Fig. 3 is a plan view of the reflector and its mounting with parts in section;

Fig. 4 is an enlarged cross section of the same on the line 4—4 of Fig. 3;

Fig. 5 is an enlarged plan view of one side of the solar transit showing more particularly the solar telescope and its reflector;

Fig. 6 is a sectional side elevation of the same on the line 6—6 of Fig. 5;

Fig. 7 is a similar view of the same on the line 7—7 of Fig. 5 and showing the declination arm in midway position;

Fig. 8 is a similar view of the same with the declination arm set to zero of the south declination;

Figs. 9 and 10 are views of the opposite sides of the reflector mounting;

Fig. 11 is an enlarged cross section of the solar transit on the line 11—11 of Fig. 1; and Fig. 12 is a sectional side elevation of the same on the line 12—12 of Fig. 11.

The frame 10 of the solar transit is provided with suitable standards 11 in which are mounted to turn the ends of a main axle 12 provided near one end with a flange 13 on which is secured by screws 14 or other fastening means the attaching member 15 of a latitude arc 16 graduated with 30' divisions, but only every fifth degree is shown in Fig. 1. A tangent screw 17 serves to move the latitude arc 16 and the said latitude arc 16 indicates on a suitable vernier 18 attached to a corresponding standard 11. The attaching member 15 of the latitude arc 16 is provided with bearings 20 in which is mounted to turn a solar telescope 21, the axis of which is at a right angle to the axis of the main axle 12.

On the objective end 22 of the solar telescope 21 is arranged a reflector 25 provided with pointed or conical pivots 26 journaled in bearings 27 in the form of disks screwing in the ends of a U-shaped frame 28 of the declination arm 29. The U-shaped frame 28 is hung on pointed, threaded pivots 30 arranged in the ends of a U-shaped frame 31 provided with a collar 32 fastened by screws or other fastening means 33 to the objective end 22 of the solar telescope 21. The pivots 30 engage bearings 34 similar to the bearings 27 and likewise screwed into the ends of the frame 28, it being understood that the axes of the pivots 26 and 30 coincide, as plainly indicated in Figs. 2 and 3. The declination arm 29 extends lengthwise of the solar telescope 21, as plainly illustrated in Figs. 5, 6, 7 and 8, and terminates in a vernier 35 indicating on a declination arc 36 attached to the solar telescope 21. A tangent screw 37 mounted on the solar telescope 21 engages the declination arm 29 to impart a swinging motion to the said declination arm 29 whenever it is desired to do so. The declination arc 36 is divided into 20' divisions but only five degree divisions are shown. North declination is set off from the left to the right and south declination from the right to the left, as indicated by "N" and "S" in Figs. 7 and 8. The vernier 35 of the declination arm 29 is graduated to read to single minutes of the arc; only every tenth division is shown in the drawing. The left zero is for north declinations and the right zero is for south declinations, as indicated by "N" and "S" in Figs. 7 and 8. As illustrated in Fig. 7, the declination arm 29 is in midway position, and, as shown in Fig. 8, it is in zero position for south declination.

The frame 28 hung on the pivots 30 and carrying the pivots of the reflector 25 is provided at one of its ends with a crank arm 40, preferably made of flat German silver, and extending lengthwise along the inner face of the declination arm 29, as plainly indicated in Figs. 3 and 5. The crank arm 40 terminates at its free end in an eye 41 into which a suitable tool may be inserted for imparting a swinging motion to the crank arm 40 to turn the frame 28 on its pivots 30 with a view to turn the reflector 25 from south declination to north declination or vice versa. In order to hold the crank arm 40 in the adjusted position, the following arrangement is made: The free end of the crank arm 40 is provided with a radially disposed slot 42 adapted to be engaged by eccentric points 43, 44 held on conical studs 45, 46 journaled in corresponding bearings arranged on the declination arm 29. The studs 45 and 46 are provided with capstans 47 and 48 engaged by a plate 49 secured in position on the declination arm 29 by a screw 50 having a capstan head 51, as plainly indicated in Fig. 4. It will be noticed that the crank arm 40 can be slightly sprung away from the declination arm 29 to allow of imparting a swinging motion to the crank arm 40 to engage the slot 42 with either eccentric point 43 or 44 according to whether the reflector 25 is to be set to south or north declination. It will further be noticed that after the point 43 or 44 engages the slot 42, a minute adjustment may be given to the crank arm 40 on turning the corresponding stud 45 or 46 to cause the eccentric pin 43 or 44 to slightly swing the crank arm 40 to the right or left to eliminate what is known as "index error" of the declination arc in either of its positions. The eyepiece end of the solar telescope 21 is provided with the usual hour circle 60.

The transit telescope 70 is mounted in a band 71 forming an integral part of a hub 72, one end 73 of which engages a conical bearing 74 formed on the main axle 12, as plainly shown in Fig. 11. The other end 75 of the hub 72 engages a conical bearing 76 formed on a sleeve 77 through which extends the main axle 12. One end 78 of the sleeve 77 fits onto the main axle 12 while the other end is provided with screws 79 engaging the axle 12 to permit of adjusting the sleeve 77 relative to the axle 12 so that the axis of the sleeve 77 coincides with the axis of the axle 12. By reference to Fig. 11, it will be noticed that the axle 12 is tapered from the bearing 74 toward the other end so that the sleeve 77 is spaced from the axle 12 except at the outer end 78 thereof, and hence the sleeve can be readily adjusted by the set screw 79 in order to cause the axis of the sleeve 77 to coincide with the axis of the axle 12.

From the foregoing it will be seen that by the arrangement described the solar attachment is intermediate the standards 11 and hence is protected by the standards against accidental injury. It will also be noticed that the solar attachment is nearer the middle of the transit and hence a heavy counterpoise is not required. In solar transits as now generally constructed the practical length of the declination arm of an outside solar attachment is approximately three or four inches, while with my improvement a practical length of 5½ inches of the declination arm is obtainable, thus making the setting off of the declinations much easier and with a degree of greater accuracy.

It will further be noticed that the reflector 25 has one position in relation to the arm of the declination arc for north declinations and another position for south declinations, and the reflector can be readily changed from one position to the other and it can be readily adjusted by the use of the eccentric points 43 and 44 of the studs 45 and 46 to eliminate what is known as "index error" of the declination arc and while in either position. By the arrangement described the solar telescope can be readily mounted inside the standards of the transit without interfering in any of its positions with the transit telescope.

It is understood that the solar telescope 21 is arranged in a plane parallel to that of the transit telescope 70 and the instrument is used in the usual manner. If the instrument is in proper adjustment and oriented to the true meridian, the polar axis of the solar telescope 21 may be made parallel to the earth's polar axis by setting off the true latitude of the station. The sun's image is reflected into the solar telescope 21 by means of the reflector 25 set according to the sun's north or south declination, it being understood that the solar telescope 21 is turned in its bearings 20 to reflect the sun's image into the solar telescope 21 and until the reading of the hour circle 60 agrees with the sun's apparent time.

Having thus described my invention, I claim as new and desire to secure by Letters Patent:—

1. In a solar transit, a main axle, a latitude arc secured to the said main axle, a solar telescope mounted on the said arc, a transit telescope, a hub carrying the said transit telescope and mounted to turn on the said main axle, a reflector mounted to turn on one end of the solar telescope, a declination arm mounted to swing on the axis of the said reflector, and a manually controlled arm connected with the reflector for turning the same independent of the said declination arm.

2. In a solar transit, a main axle, a latitude arc secured to the said axle, a solar telescope mounted on the said arc, a transit telescope, a hub carrying the said transit telescope and mounted to turn on the said main axle, a frame attached to the objective end of the solar telescope, a declination arm mounted to swing on the said frame, and a reflector mounted to turn on the said declination arm at the objective end of the solar telescope.

3. In a solar transit, a main axle, a latitude arc secured to the said axle, a solar telescope mounted on the said arc, a transit telescope, a hub carrying the said transit telescope and mounted to turn on the said main axle, a frame attached to the objective end of the solar telescope, a declination arm mounted to swing on the said frame, a reflector mounted to turn on the said declination arm at the objective end of the solar telescope, and means adjusting the said reflector relative to the said declination arm to eliminate index errors.

4. In a solar transit, a main axle, a latitude arc secured to the said axle, a solar telescope mounted on the said arc, a transit telescope, a hub carrying the said transit telescope and mounted to turn on the said main axle, a frame attached to the objective end of the solar telescope, a declination arm mounted to swing on the said frame, and a reflector mounted to turn on the said declination arm at the objective end of the solar telescope, a crank arm on the said reflector, and studs mounted to turn on the said declination arm and having eccentric means adapted to engage the said crank arm.

5. In a solar transit, a main axle, a latitude arc secured to the said axle, a solar telescope mounted on the said arc, a transit telescope, a hub carrying the said transit telescope and mounted to turn on the said main axle, a frame attached to the objective end of the solar telescope, a declination arm mounted to swing on the said frame, a reflector mounted to turn on the said declination arm at the objective end of the solar telescope, a crank arm secured on the said reflector and having a slot at its free end, and spaced studs mounted to turn in the said declination arm and having eccentric points adapted to engage the said slot.

6. In a solar transit, a declination arc having two graduations, comprising a single set of divisions and north declination and south declination set off from opposite ends of the arc.

7. In a solar transit, a declination arc having two graduations comprising a single set of divisions, north declination and south declination set off from opposite ends of the arc, and a declination arm having a vernier indicating on the said arc, the vernier having spaced zero marks one for north declination and the other for south declination.

8. In a solar transit, a solar telescope, a reflector mounted to turn on the objective end of the said solar telescope, a declination arm mounted to swing and having its axis coinciding with that of the reflector, the declination arm having a vernier provided with spaced zero marks for north and south declinations, a declination arc on which indicates the said vernier, the said declination arc having two graduations extending in opposite directions, one being for north declination and the other being for south declination, and means adjusting the said reflector relative to the said declination arm.

9. In a solar transit, a solar telescope, a reflector mounted to turn on the objective end of the said solar telescope, a declination arm mounted to swing and having its axis coinciding with that of the reflector, the declination arm having a vernier provided with spaced zero marks for north and south declinations, a declination arc on which indicates the said vernier, the said declination arc having two graduations extending in opposite directions, one being for north declination and the other being for south declination, a crank arm on the said reflector, and means on the said declination arm and adapted to engage the said crank arm.

10. In a solar transit, a main axle, a latitude arc attached to the said axle, a solar telescope mounted on the said latitude arc, a reflector mounted to turn on one end of the said solar telescope, a declination arm mounted to swing on the said reflector, and a manually controlled reflector arm for turning the latter independent of the said declination arm.

11. In a solar transit, a solar telescope, a reflector mounted to turn at one end of the said solar telescope, a declination arm mounted to swing on the axis of the said reflector and provided with a vernier, a declination arc attached to the said solar telescope and on which indicates the said vernier, and a reflector arm secured to the said reflector to turn the latter independent of the said declination arm.

12. In a solar transit, a solar telescope, a reflector mounted to turn at one end of the said solar telescope, a declination arm mounted to swing on the axis of the said reflector and provided with a vernier, a declination arc attached to the said solar telescope and on which indicates the said vernier, a reflector arm secured to the said reflector to turn the latter independent of the said declination arm, and manually controlled means clamping the said reflector arm to the declination arm.

HERBERT NEWTON RAYMOND.

Copies of this patent may be obtained for five cents each, by addressing the "Commissioner of Patents, Washington, D. C."